J. GOOD.
SEPARATOR.
APPLICATION FILED OCT. 30, 1915.
1,306,003.
Patented June 10, 1919.
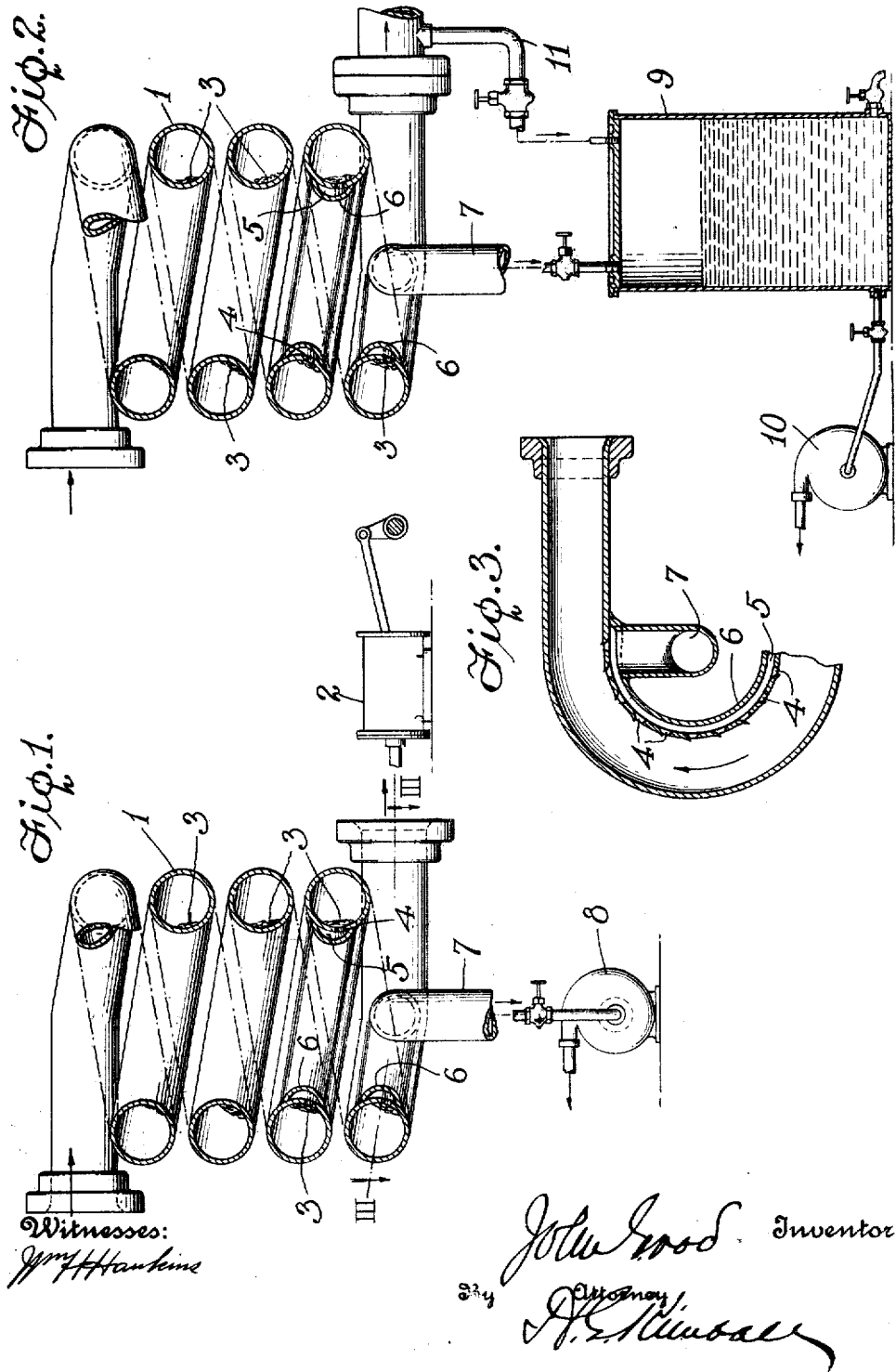

UNITED STATES PATENT OFFICE.

JOHN GOOD, OF NEW YORK, N. Y.

SEPARATOR.

1,306,003.  Specification of Letters Patent.  Patented June 10, 1919.

Application filed October 30, 1915. Serial No. 58,738.

*To all whom it may concern:*

Be it known that I, JOHN GOOD, a citizen of the United States, residing in the borough of Brooklyn, city, county, and State of New York, have invented the following-described new and useful Improvements in Separators.

This invention provides an effective and inexpensive means of separating liquid from gaseous matter and involves the utilization of certain phenomena I have observed to attend the flow of mixed gases and liquids through curved, helical or spiral pipes. If a mixture of steam and water particles, or any vapor or gas with liquid mixed therein, be passed through such a pipe at sufficient velocity, the denser or liquid element will flow to and collect upon the wall of the passage which forms the inner side of the curve; that is to say, if the curve is a helix, the liquid will collect on the wall of the passage that is nearest the axis of the helix and from such location it can be deflected or withdrawn in separate condition by various means. While such action will be observed to be apparently contradictory to the general assumption as to separation by centrifugal action, it is subject to explanation on the theory that although the liquid particles may first impinge on the outer wall, the greater pressure at that side and the greater surface friction of the liquid on the walls of the pipe result in movement toward the inner wall on which they may be observed to form a ropy stream running toward the exit, and leaving the gaseous element substantially free from liquid. Three or four turns of the helix form, will suffice to give a fairly thorough separation of liquid for normal conditions and such as encountered in refrigerating, steam or carburetion systems, but of course the degree or extent of curvature, the diameter of pipe and its cross-sectional form may be varied to suit conditions and no limitation is herein intended as to the number of turns or radius of curvature, nor to other details except as specifically defined by the claims. The means of deflecting and withdrawing the separated liquid or gas may obviously be varied indefinitely, and although the cross-section of the pipe is desirably circular or round, it may have other sections.

In the accompanying drawings I have shown a form of separator apparatus illustrating a simple form of such means.

Figure 1 is a central vertical section of a pipe helix, with suction pumps diagrammatically indicated for moving and removing the liquid and gas, respectively.

Fig. 2 is a similar view showing a means for removing collected liquid either intermittently or continuously; and Fig. 3 is a section on line III—III of Fig. 1.

Referring to Figs. 1 and 3, the curved pipe 1 is supposed to be connected at its entrance end with some source of supply of mixed liquid and gas, such, for instance, as the exhaust from an expansion refrigerating system, or a steam line, or to the carbureted mixture produced for use in internal combustion engines. Its outlet end is connected with a gas-removing device, for instance, the compressor 2 of the refrigerating system. As above stated, the liquid particles passing through this pipe will collect more or less progressively upon the wall which forms the inside of the helical curve and as intended to be represented at 3. A number of liquid outlets 4 in this wall conducts the liquid so collected to the liquid chamber 5 formed by a curved wall strip 6 surrounding or formed on the outside of the said wall. This collecting chamber extends alongside of the main pipe 1 for such distance as suffices to remove all of the liquid collecting as described, and thence leads to a liquid off-take 7, connected with a liquid pump 8. So long as the two pumps are operated at harmonous speeds, the pump 2 will withdraw only gas and the pump 8 only liquid, the latter being thereby removed from the separator at substantially the same pressure as the gas. Of course, the pumps are to be understood as representing any suitable means for withdrawing the gas and liquid.

In Fig. 2, the curved pipe, liquid outlet and collecting chamber are the same as first described, but the pipe 7 leads to a liquid tank 9, in which the separated liquid may collect to be withdrawn intermittently, as from a faucet, or by means of a pump 10, or continuously if desired. This tank is provided with an equalizer connection 11, to the outlet of the separator helix which insures flow through the off-take by equalizing the pressure in the tank and gas outlet. The liquid outlets 4 are shown as formed with liquid-deflecting edges which tend to facilitate the change of direction of the outflowing liquid.

While I have shown the liquid collecting chamber as a space secured to and extending along with a portion of the helical pipe, it will nevertheless be evident that the said chamber may be of larger or smaller size, embracing all or only a part of the helical pipe and, if need be, entirely surrounding the same.

Having described my invention and the principle thereof and the best mode in which I have at present contemplated using the same, although it is susceptible of use for many and widely different purposes, what I claim as the subject of this patent is:

1. A method of separating liquid from gas, which consists in passing the same through a curved, helical or spiral pipe or passage, at sufficient velocity, to cause the liquid to collect and flow upon the inside curved wall thereof, and deflecting the said collected liquid separate from the gas.

2. The method of separating liquid and gas, which consists in passing the same through a helical or spiral passage, causing the liquid to collect and flow upon the inside curved wall thereof, and withdrawing collected liquid through said inside curved wall of the passage while preventing the same from being discharged from the outer curve.

3. The method of separating liquid and gas, which consists in passing the same through a curved, helical or spiral passage at high velocity, causing the liquid to collect on the inner curve of the passage while preventing the same from being discharged from the outer curve and withdrawing the said collected liquid at substantially the same pressure as the gas.

4. A separator comprising a curved, spiral or helical passage having liquid outlets formed in the wall on the inside of the curve thereof and being devoid of liquid outlets upon the outside.

5. A separator comprising a curved, spiral or helical passage having one or more liquid outlets therein for liquid collecting on the inside curve thereof and being devoid of liquid outlets upon the outside, and means for moving the gas through said passage and the liquid through said outlets at substantially the same pressure.

6. A separator comprising a helical passage adapted to conduct the materials to be separated, and a withdrawal passage for the denser material communicating with said helical passage at the inside of the helix, the helix being devoid of liquid outlets upon the outside.

7. A separator comprising a curved, spiral or helical passage of appropriate cross-sectional shape and linear dimensions to cause a mixture of gas and liquid flowing therethrough to separate, the liquid first impinging on the outer wall of the curved passage at its entrance and then flowing to or along the inner wall thereof, said passage, beyond its entrance, being provided with one or more liquid outlets leading from the inner side of the curve and devoid of liquid outlet from the outer side of the curve.

In testimony whereof, I have signed this specification in the presence of two witnesses.

JOHN GOOD.

Witnesses:
JOHN T. CROWLEY,
K. L. GRANT.

Copies of this patent may be obtained for five cents each, by addressing the "Commissioner of Patents, Washington, D. C."